US012426754B2

(12) United States Patent
Jeong et al.

(10) Patent No.: US 12,426,754 B2
(45) Date of Patent: Sep. 30, 2025

(54) CLEANING ROBOT AND CONTROLLING METHOD THEREOF

(71) Applicant: Samsung Electronics Co., Ltd., Suwon-si (KR)

(72) Inventors: Jaeyoon Jeong, Suwon-si (KR); Hyoungjin Lee, Suwon-si (KR); Dohyeong Hwang, Suwon-si (KR); Minwoo Ryu, Suwon-si (KR); Sangsik Yoon, Suwon-si (KR); Donghun Lee, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 196 days.

(21) Appl. No.: 18/316,713

(22) Filed: May 12, 2023

(65) Prior Publication Data
US 2023/0277024 A1    Sep. 7, 2023

Related U.S. Application Data

(63) Continuation of application No. PCT/KR2021/017200, filed on Nov. 22, 2021.

(30) Foreign Application Priority Data

Jan. 11, 2021  (KR) .................. 10-2021-0003438
Mar. 30, 2021  (KR) .................. 10-2021-0041092

(51) Int. Cl.
*A47L 9/28*        (2006.01)
*B25J 5/00*        (2006.01)
(Continued)

(52) U.S. Cl.
CPC ........... *A47L 9/2805* (2013.01); *A47L 9/2852* (2013.01); *A47L 9/2894* (2013.01); *B25J 5/007* (2013.01);
(Continued)

(58) Field of Classification Search
CPC .... A47L 9/2805; A47L 9/2852; A47L 9/2894; A47L 2201/04; A47L 11/4061;
(Continued)

(56) References Cited

U.S. PATENT DOCUMENTS 10,007,267 B2  6/2018  Yu et al.
10,111,566 B2  10/2018  Ahn et al.
(Continued)

FOREIGN PATENT DOCUMENTS

JP  2019-071046 A  5/2019
JP  2021-137153 A  9/2021
(Continued)

OTHER PUBLICATIONS

International Search Report dated Mar. 11, 2022, issued in International Patent Application No. PCT/KR2021/017200.

*Primary Examiner* — Khoi H Tran
*Assistant Examiner* — Nhi Q Bui
(74) *Attorney, Agent, or Firm* — Jefferson IP Law, LLP

(57) ABSTRACT

A controlling method of a cleaning robot is provided. The controlling method includes obtaining lidar data while a lidar sensor rotates multiple times, calculating a reference value which is the average value of distances from a subject according to angles, based on the obtained lidar data, after the reference value is calculated, comparing the obtained lidar data with the reference value, sensing a motion of an object based on a comparison result, and determining that the object is located in a rotation section where the motion has been detected.

17 Claims, 15 Drawing Sheets

(51) Int. Cl.
  *B25J 9/16* (2006.01)
  *B25J 11/00* (2006.01)
  *B25J 13/00* (2006.01)
  *G05D 1/00* (2006.01)

(52) U.S. Cl.
  CPC ......... *B25J 9/1697* (2013.01); *B25J 11/0085* (2013.01); *B25J 13/003* (2013.01); *G05D 1/024* (2013.01); *G05D 1/0246* (2013.01); *G05D 1/0255* (2013.01); *G05D 1/12* (2013.01); *A47L 2201/04* (2013.01)

(58) Field of Classification Search
  CPC ...... A47L 11/4011; B25J 5/007; B25J 9/1697; B25J 11/0085; B25J 13/003; G05D 1/024; G05D 1/0246; G05D 1/025; G05D 1/12; G05D 1/0248; G05D 1/0253; G05B 15/02; G05B 2219/45098
  See application file for complete search history.

(56) References Cited

U.S. PATENT DOCUMENTS

| | | | |
|---|---|---|---|
| 10,583,561 | B2 | 3/2020 | Suvarna et al. |
| 11,350,809 | B2 | 6/2022 | Hong et al. |
| 2006/0061657 | A1 | 3/2006 | Rew et al. |
| 2017/0127652 | A1* | 5/2017 | Shen .................... A01K 15/023 |
| 2018/0211103 | A1* | 7/2018 | Sohn ...................... G06V 40/23 |
| 2018/0353042 | A1 | 12/2018 | Gil et al. |
| 2020/0039074 | A1 | 2/2020 | Jeong |
| 2020/0379478 | A1* | 12/2020 | Shin .................... G05D 1/0238 |
| 2021/0161351 | A1 | 6/2021 | Lee et al. |
| 2021/0311191 | A1* | 10/2021 | Nagashima ........... G01S 17/931 |

FOREIGN PATENT DOCUMENTS

| | | | | |
|---|---|---|---|---|
| KR | 10-0677252 B1 | | 2/2007 | |
| KR | 10-2015-0095440 A | | 8/2015 | |
| KR | 2015095440 A | * | 8/2015 | .......... B25J 11/0085 |
| KR | 10-2015-0126106 A | | 11/2015 | |
| KR | 10-1671148 B1 | | 10/2016 | |
| KR | 10-2017-0010131 A | | 1/2017 | |
| KR | 20170010131 A | * | 1/2017 | ............ B25J 11/008 |
| KR | 10-2019-0071945 A | | 6/2019 | |
| KR | 10-2103291 B1 | | 5/2020 | |
| KR | 10-2020-0084449 A | | 7/2020 | |
| WO | WO-2018101430 A1 | * | 6/2018 | |

* cited by examiner

CLEANING ROBOT AND CONTROLLING METHOD THEREOF

CROSS-REFERENCE TO RELATED APPLICATION(S)

This application is a continuation application, claiming priority under § 365(c), of an International application No. PCT/KR2021/017200, filed on Nov. 22, 2021, which is based on and claims the benefit of a Korean patent application number 10-2021-0003438, filed on Jan. 11, 2021, in the Korean Intellectual Property Office, and of a Korean patent application number 10-2021-0041092, filed on Mar. 30, 2021, in the Korean Intellectual Property Office, the disclosure of each of which is incorporated by reference herein in its entirety.

BACKGROUND

1. Field

The disclosure relates to a cleaning robot for sensing motion of an object and controlling method thereof.

2. Description of Related Art

A cleaning robot is a device that sucks up debris including dust from the floor while autonomously moving in an area to be cleaned without user manipulation.

The cleaning robot is equipped with a lidar sensor to obtain a map of where the cleaning robot is and recognize a location of the cleaning robot on the map.

Furthermore, the lidar sensor may use cumulative lidar data to detect motion of an object moving outside the cleaning robot.

In the meantime, the cleaning robot may be connected to a smart phone to capture the interior of a house through a camera installed therein and provide the user with a monitoring function.

When there is a companion animal in the house, the user may remotely move the cleaning robot to monitor a condition of the animal, in which case, however, it is difficult to find an initial location of the animal and a series of actions to control movement of the cleaning robot are involved with the smart phone, causing inconvenience.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a cleaning robot capable of actively monitoring the interior of a house by using a lidar sensor and controlling method thereof.

Additional aspects will be set forth in part in the description which follows and, in part, will be apparent from the description, or may be learned by practice of the presented embodiments.

In accordance with an aspect of the disclosure, a controlling method of a cleaning robot is provided. The controlling method includes obtaining lidar data with a lidar sensor rotating multiple times, calculating a reference value, which is an average of distances to an object for respective angles, based on the obtained lidar data, comparing lidar data obtained after the reference value is calculated with the reference value, and detecting motion of the object based on a result of the comparing and determining that the object is located in a rotation section in which the motion is detected.

The controlling method further includes specifying an interested angle area in a direction toward the object.

The controlling method further includes a camera configured to obtain an external image of the cleaning robot, and the specifying of the interested angle area includes controlling a moving module of the cleaning robot for the camera to capture an area corresponding to the interested angle area.

The controlling method further includes a sound detector arranged in a main body of the cleaning robot and configured to obtain sound data about a sound produced from outside the cleaning robot, and include identifying the object by processing the sound data.

The sound detector further includes a plurality of microphones symmetrically arranged in the main body, and the identifying of the object includes determining a location of the object based on a median of signal levels of sound obtained from the plurality of microphones.

The determining of the location of the object includes controlling a moving module of the cleaning robot to capture an area corresponding to a location of the object based on the location of the object determined based on sound data obtained through the sound detector.

The determining of the object being located includes specifying an interested angle area in an angle direction toward the object based on detection of motion of the object, and in response to a location of the object determined based on the sound data belonging to the interested angle area, controlling the moving module to capture an area corresponding to the interested angle area.

The determining of the object being located includes specifying an interested angle area in a direction toward the object based on detection of motion of the object, and in response to a location of the object determined based on the sound data not belonging to the interested angle area, controlling the moving module to capture a location from which sound of the object is detected.

The determining of the object being located includes controlling the moving module to capture a location from which sound of the object is detected based on the sound data in response to no motion of the object detected.

The controlling method further includes a communication module configured to perform communication with a user equipment, and controlling the communication module to provide an event about the object to the user equipment in response to determination that a sound is produced from the object as a result of processing the sound data.

The controlling method further includes a communication module configured to perform communication with a user equipment, and controlling the camera to capture an area corresponding to the interested angle area and controlling the communication module to provide an image of the captured object to the user equipment.

The controlling method further includes a dispenser for storing contents and discharging the contents, and controlling the dispenser to discharge the contents at preset intervals in response to detection of motion of the object.

The controlling method further includes a laser arranged in the main body of the cleaning robot for outputting a laser beam, and controlling the laser to output the laser beam downward in response to detection of motion of the object.

In accordance with another aspect of the disclosure, a cleaning robot is provided. The cleaning robot includes a main body, a moving module configured to move the main body, a lidar sensor configured to include a lidar light emitter and a lidar light receiver and obtain lidar data while rotating multiple times, and at least one processor configured to calculate a reference value, which is an average of distances to an object for respective angles, based on the obtained lidar data, compare lidar data obtained after the reference value is calculated with the reference value, and detect motion of the object based on a result of the comparing and determine that the object is located in a rotation section in which the motion is detected.

The cleaning robot further includes a sound detector arranged in the main body of the cleaning robot for obtaining sound data about a sound produced outside the cleaning robot, and the at least one processor identifies the object by processing the sound data.

The sound detector includes a plurality of microphones symmetrically arranged in the main body, and the at least one processor determines a location of the object based on a median of signal levels of sound obtained from the plurality of microphones.

The at least one processor controls the driver of the cleaning robot to capture an area corresponding to a location of the object in response to determination of the location of the object based on the sound data obtained through the sound detector.

The at least one processor specifies an interested angle area in an angle direction toward the object based on detection of motion of the object, and in response to the location of the object determined based on the sound data belonging to the interested angle area, control the moving module to capture an area corresponding to the interested angle area.

The at least one processor specifies an interested angle area in a direction toward the object based on detection of motion of the object, and in response to the location of the object determined based on the sound data not belonging to the interested angle area, control the moving module to capture a location detected with a sound of the object.

The at least one processor controls the moving module to capture a location detected with a sound of the object based on the sound data in response to no motion of the object detected.

According to the disclosure, various events occurring in the house may be identified without the user controlling motion of a cleaning robot. Furthermore, according to the disclosure, various conveniences in addition to a basic function of the cleaning robot may be provided by identifying a condition of a companion animal in the house in real time.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
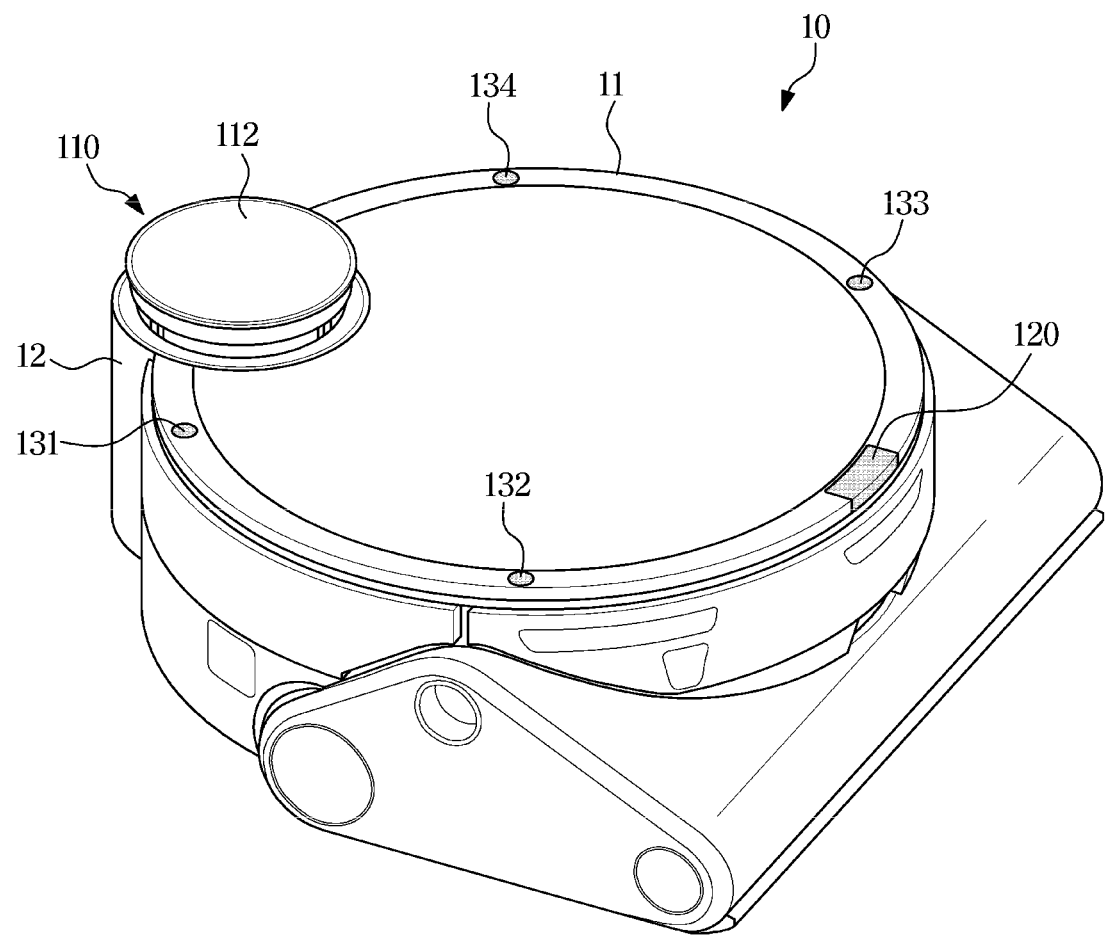
FIG. 1 illustrates a cleaning robot, according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The term 'unit, module, member, or block' may refer to what is implemented in software or hardware, and a plurality of units, modules, members, or blocks may be integrated in one component or the unit, module, member, or block may include a plurality of components, depending on the embodiment of the disclosure.

It will be further understood that the term "connect" or its derivatives refer both to direct and indirect connection, and the indirect connection includes a connection over a wireless communication network.

The term "include (or including)" or "comprise (or comprising)" is inclusive or open-ended and does not exclude additional, unrecited elements or method steps, unless otherwise mentioned.

Throughout the specification, when it is said that a member is located "on" another member, it implies not only that the member is located adjacent to the other member but also that a third member exists between the two members.

It will be understood that, although the terms first, second, third, or the like, may be used herein to describe various elements, components, regions, layers and/or sections, these elements, components, regions, layers and/or sections should not be limited by these terms. These terms are only used to distinguish one element, component, region, layer or section from another region, layer or section.

Reference numerals used for method steps are just used for convenience of explanation, but not to limit an order of the steps. Thus, unless the context clearly dictates otherwise, the written order may be practiced otherwise.

Reference will now be made to embodiments of the disclosure, which are illustrated in the accompanying drawings.

Figure 2:
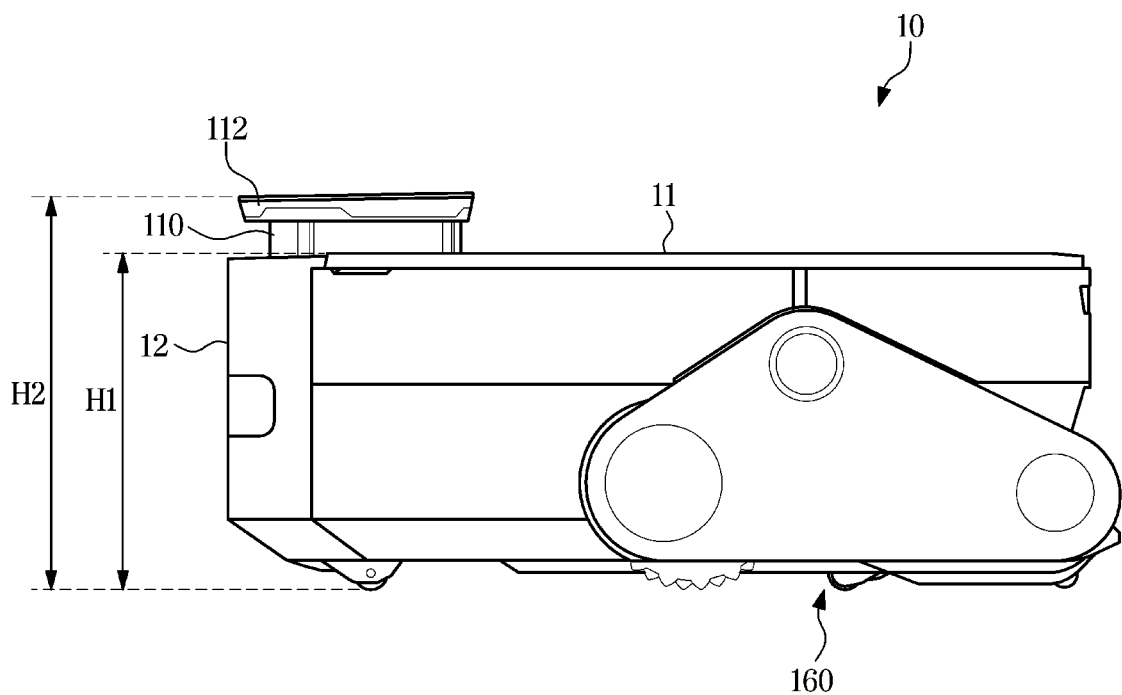
FIG. 2 is a side view of a cleaning robot, according to an embodiment of the disclosure.
Figure 3:
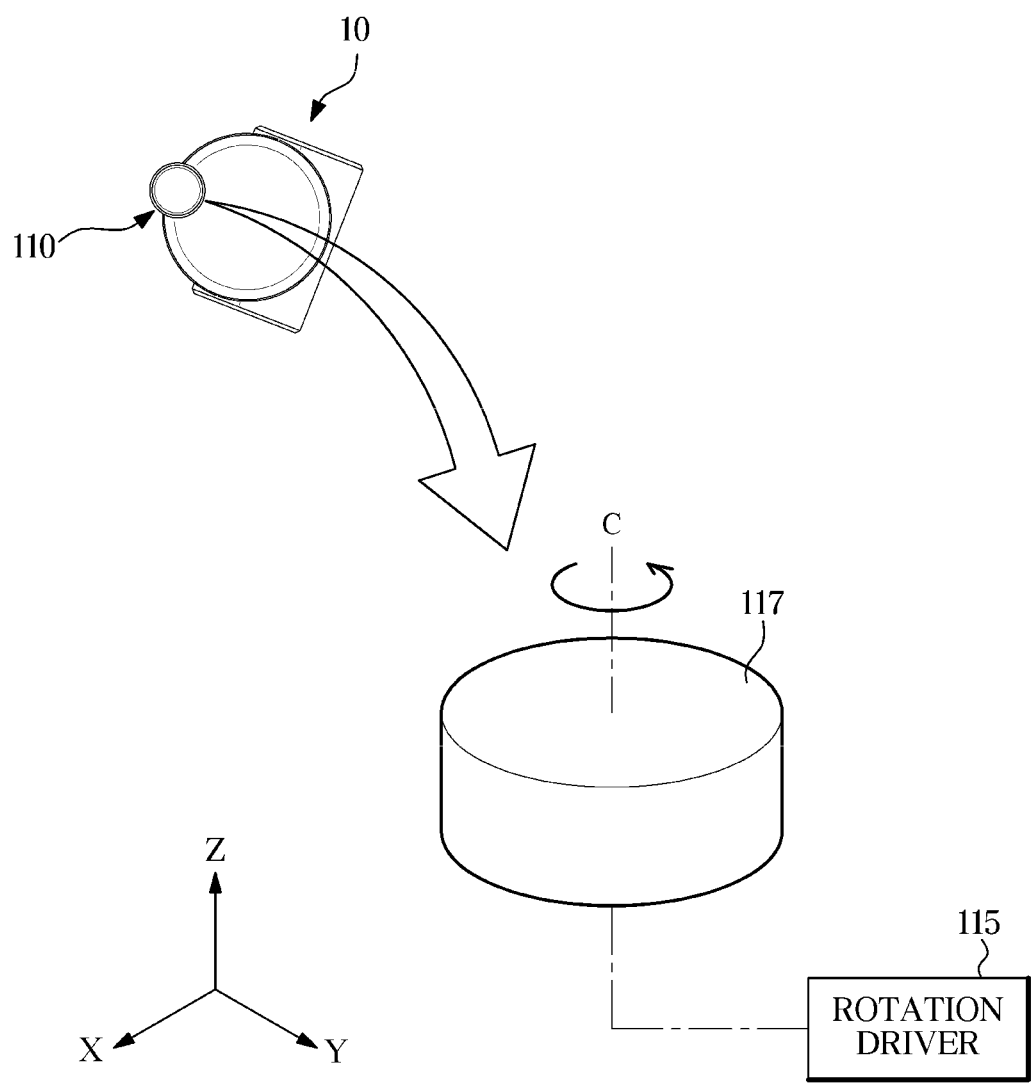
FIG. 3 illustrates a lidar sensor of a cleaning robot, according to an embodiment of the disclosure.
Figure 4:
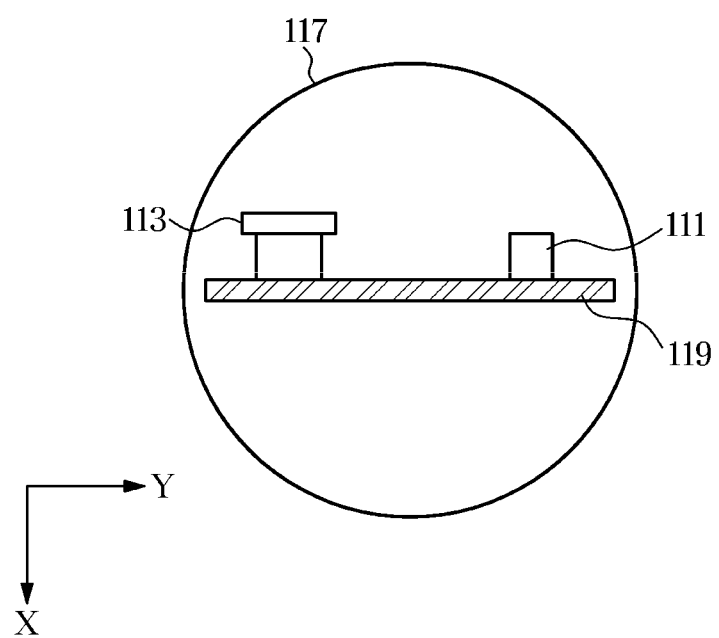
FIG. 4 illustrates a light emitter and a light receiver of a cleaning robot, according to an embodiment of the disclosure.
Figure 5:
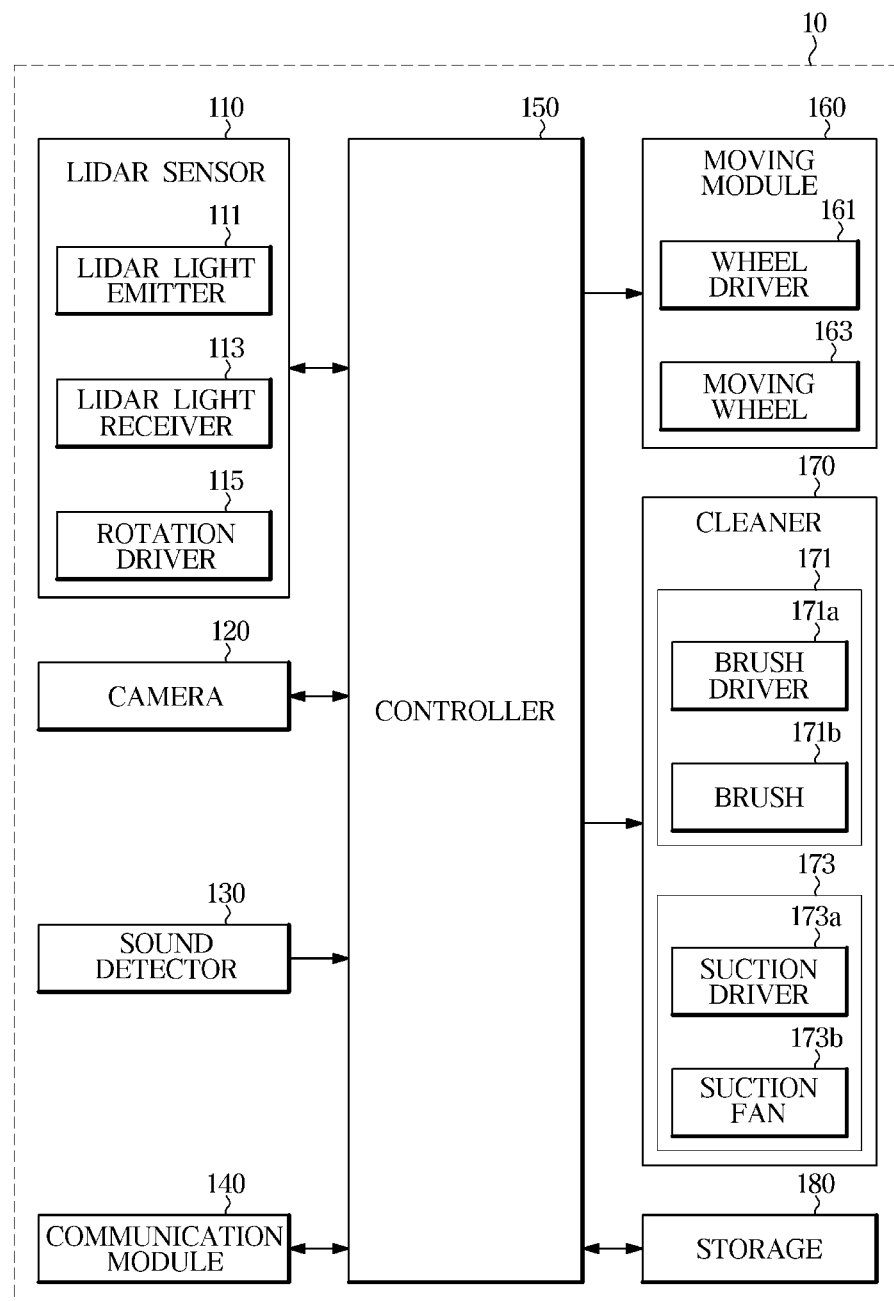
FIG. 5 is a control block diagram of a cleaning robot, according to an embodiment of the disclosure.

FIG. 1 illustrates a cleaning robot, according to an embodiment of the disclosure, FIG. 2 is a side view of a cleaning robot, according to an embodiment of the disclosure, FIG. 3 illustrates a lidar sensor of a cleaning robot, according to an embodiment of the disclosure, FIG. 4 illustrates a light emitter and a light receiver of a cleaning robot, according to an embodiment of the disclosure, and FIG. 5 is a control block diagram of a cleaning robot, according to an embodiment of the disclosure.

Referring to FIGS. 1 and 2, a cleaning robot 10 in an embodiment may include a main body 11 and a rear cover 12 which form the exterior of the cleaning robot 10, a moving module 160 for moving the cleaning robot 10, a lidar sensor 110, and a top cover 112 for covering an upper end of the lidar sensor 110.

The lidar sensor 110 may be arranged on top of the main body 11 to rise and fall between a first position and a second position at different heights.

Referring to FIG. 2, based on the ground on which the cleaning robot 10 is located, height H1 of the lidar sensor 110 at the first position is higher than height H2 of the lidar sensor 110 at the second position.

For example, the lidar sensor 110 may be arranged to be inserted to the inside of the main body 11 or to protrude outward from the main body 11. The lidar sensor 110 may be located in the first position when inserted to the inside of the main body 11, and in the second position when protruding outward from the main body 11.

The lidar sensor 110 is inactive while inserted to the inside of the main body 11. However, when the rear cover 12 is implemented in a transparent material, the lidar sensor 110 may be active and is able to perform sensing on an area behind the cleaning robot 10 even in the state of being inserted to the inside of the main body 11.

The height of the lidar sensor 110 may be controlled based on the condition of the cleaning robot 1.

In an embodiment of the disclosure, the moving module 160 may include moving wheels 163 arranged on the left and right sides. For example, the moving wheels 163 may include a left moving wheel arranged on the left side of the main body 11 and a right moving wheel arranged on the right side of the main body 11.

In this case, with rotation of the moving wheels 163, the main body 11 may move forward, move rearward, or rotate. For example, when both the left and right moving wheels 163 rotate forward, the main body 11 may make forward rectilinear motion, and when both the left and right moving wheels rotate rearward, the main body 11 may make rearward rectilinear motion.

Furthermore, when the left and right moving wheels rotate in the same direction at different speeds, the main body 11 may make curvilinear motion to the left or right, and when the left and right moving wheels rotate in different directions, the main body 11 may rotate to the left or right at the same place.

Furthermore, the cleaning robot 10 may further include a castor arranged at the bottom surface of the main body 11. The castor may be installed at the bottom surface of the main body 11 and rotated in the direction of the movement of the main body 11, to assist the main body 11 to move in a stable posture.

Referring to FIGS. 3 and 4, the cleaning robot 10 may include the lidar sensor 110 for detecting an external object (obstacle).

The cleaning robot 10 may perform cleaning while moving in an area to be cleaned, and when an obstacle is detected by the lidar sensor 110, may avoid or step over the obstacle.

The obstacle detected by the lidar sensor 110 may refer to any object that protrudes or is sunken from the floor, wall or ceiling of the area to be cleaned, hindering the moving of the cleaning robot 10. In other words, an object located in a moving path of the cleaning robot 10, i.e., in the area to be cleaned, may be an obstacle to the cleaning robot 10.

For example, not only the furniture, such as a table, a sofa, or the like, located in the area to be cleaned but also a wall that divides the space may correspond to the obstacle, and an object, such as a carpet, a threshold or an object, such as a round bar that the cleaning robot 10 may climb up and down may also correspond to the obstacle. Furthermore, an object that is not stationarily located in the area to be cleaned, e.g., a glass, a dish, dog droppings, a bag, or the like, may also correspond to the obstacle for the cleaning robot 10 to avoid or step over.

Whether the detected obstacle is to be avoided or stepped over by the cleaning robot 10 may be determined based on the size of the detected obstacle, and the size of the obstacle may be determined based on at least one of height, width and depth of the obstacle.

Furthermore, the cleaning robot 10 may detect a mobile object in addition to the stationary obstacle with the lidar sensor 110. The object is a moving thing in the area to be cleaned, corresponding to a person or a companion animal.

The cleaning robot 10 may detect motion of the object with the lidar sensor 110 and distinguish the object from the stationary obstacle, and may find a position of the object with respect to the cleaning robot 10. For example, the cleaning robot 10 may find an azimuth angle of the object based on the cleaning robot 10 or a cleaning map, and obtain a distance from the cleaning robot 10 and coordinate information of the object on the cleaning map. A detailed procedure in which the cleaning robot 10 detects motion of the object and specifies a kind of the object will be described later with reference to FIGS. 5 to 10.

The lidar sensor 110 may include a lidar light emitter 111 for emitting light, a lidar light receiver 113 arranged to receive light in a preset direction among reflected light when the light emitted from the lidar light emitter 111 is reflected from the obstacle, and a circuit board 119 to which the lidar light emitter 111 and the lidar light receiver 113 are fixed. In this case, the circuit board (or printed circuit board (PCB)) 119 is arranged on a supporting plate 117 that is rotated by a rotation driver 115, thereby being able to rotate 360 degrees clockwise or counterclockwise.

Specifically, the supporting plate 117 may be rotated around an axis C as a center according to power delivered from the rotation driver 115, and the lidar light emitter 111 and the lidar light receiver 113 are fixed to the circuit board 119 and arranged to be able to rotate 360 degrees clockwise or counterclockwise along with the rotation of the circuit board 119. With this, the lidar sensor 110 may emit and receive light in 360 degrees to detect an obstacle and an object in all directions.

The lidar light emitter 111 is a component for emitting light (e.g., an infrared laser), and may be provided in the singular or plural depending on the embodiment.

When light emitted from the lidar light emitter 111 is reflected from an obstacle, the lidar light receiver 113 is arranged to receive the light of a preset direction among the reflected light. An output signal generated after the lidar light receiver 113 receives the light may be provided in an obstacle detection procedure of the controller (not shown).

The lidar light receiver 113 may include a condensing lens for concentrating the received light and a light sensor for detecting the received light. In an embodiment of the disclosure, the lidar light receiver 113 may include an amplifier for amplifying the light detected by the light sensor.

The light sensor may convert the light into an electric signal and send the electric signal to the controller. The light sensor may include a photo diode, a photo diode array, a charge coupled device (CCD) sensor, a complementary metal-oxide semiconductor (CMOS) sensor, a cadmium sulfide (CDS) sensor, or the like. Available examples of the light sensor are not, however, limited thereto.

The supporting plate 117 may be arranged to be rotated by the rotation driver 115. The rotation driver 115 may include an encoder (not shown), which may provide rotation angle information to the controller for an obstacle detection procedure. The rotation angle information of the supporting plate 117 sent from the encoder may include direction information of an obstacle. The controller may detect the obstacle based on the electric signal output from the lidar light emitter 111 and the lidar light receiver 113 with the rotation angle information of the supporting plate 117 sent from the encoder of the rotation driver 115.

The circuit board 119 may be arranged on the supporting plate 117 and rotated along with the supporting plate 117, and may have the lidar light emitter 111 and the lidar light receiver 113 arranged on one side. In this case, the lidar light emitter 111 and the lidar light receiver 113 may be arranged at different heights in the vertical direction (the z-axis) on the circuit board 119 or at the same height in the vertical direction (the z-axis) on the circuit board 119.

In another embodiment of the disclosure, the lidar sensor 110 may include the lidar light emitter 111 and the lidar light receiver 113 arranged in fixed positions not rotated, and may include a rotating polygonal mirror (not shown) or a rotating mirror (not shown) rotated by the rotation driver 115. In this case, the light emitted from the lidar light emitter 111 may be radiated in all directions through the rotating polygonal mirror or rotating mirror, and the light reflected from an obstacle may be received by the lidar light receiver 113 through the rotating polygonal mirror or the rotating mirror.

Structural features of the cleaning robot 10 have thus far been described. Control flows of the cleaning robot 10 detecting motion of an object and monitoring the object will now be described below.

FIG. 5 is a control block diagram of a cleaning robot, according to an embodiment of the disclosure.

Referring to FIG. 5, the cleaning robot 10 in the embodiment may include the lidar sensor 110 for detecting external things (obstacles and objects), a camera 120 for capturing an external viewing area of the cleaning robot 10, a sound detector 130 for detecting a sound produced outside, a communication module 140 for communicating with a user equipment 20, a controller 150 for controlling the camera 120 and the moving module 160 based on detection of the motion of the object, the moving module 160 for moving the main body 11, a cleaner 170 for performing cleaning by scattering dust on the floor and sucking up the scattered dust while moving, and a storage 180 for storing various kinds of information required for controlling.

At least one component may be added to or omitted from the cleaning robot 10 to correspond to the performance of the cleaning robot 10 as shown in FIG. 5. Furthermore, it will be obvious to those of ordinary skill in the art that the relative positions of the components may be changed to correspond to the system performance or structure.

The lidar sensor 110 includes the lidar light emitter 111 for emitting light to an external object, the lidar light receiver 113 for receiving light reflected from the external object, and the rotation driver 115 for conveying rotation force to the supporting plate 117 on which the lidar light emitter 111 and the lidar light receiver 113 are arranged.

The lidar sensor 110 may control the rotation driver 115 to convey the rotation force to the supporting plate 117 under the control of the controller 150. In this case, the supporting plate 117 may rotate at a constant angle speed, and the circuit board 119 fixed on the supporting plate 117 may also rotate at the constant angle speed. With this, the lidar light emitter 111 and the lidar light receiver 113 may identify an external object located in the range of 360 degrees by transmitting and receiving light while rotating at the constant angle speed.

The camera 120 may be arranged in the main body 11 to capture a two-dimensional (2D) or three-dimensional (3D) image related to surroundings of the cleaning robot 10. When the controller 150 determines a location of the object, the camera 120 may capture an area including the location of the object.

The sound detector 130 is arranged in the main body 11 to detect a sound produced around the cleaning robot 10. The sound detector 130 may include a plurality of microphones 131 to 134, and the number of the microphones is not limited to what is shown in FIG. 1.

The sound detector 130 detects a sound produced around the cleaning robot 10, and send the sound data to the controller 150 so that the controller 150 processes the sound data to identify the object. Specifically, the controller 150 selects a partial section related to the obtained sound data to extract a feature point in the partial section. In this case, the controller 150 may determine the feature point extracted based on a convolution neural network (CNN) to identify a kind of the object. For example, the controller 150 may process the sound data obtained by the sound detector 130 to determine the object that has produced the sound as a companion animal.

Furthermore, the sound detector 130 may be provided as the plurality of microphones 131 to 134 as shown in FIG. 1, so that the controller 150 may determine a location of the object based on the sound data. Specifically, each of the plurality of microphones 131 to 134 may obtain sound data, and the controller 150 may determine a location of the object by calculating a median of signal levels of the sound.

The communication module 140 may communicate with the user equipment 20. For example, the user equipment 20 is a remote control device to control movement of a mobile robot 100 or wirelessly transmit a control command to perform a task of the mobile robot 100, includes a cellphone or a personal communications service (PCS) phone, a smart phone, a personal digital assistant (PDA), a portable multimedia player (PMP), a laptop computer, a digital broadcast terminal, a netbook, a tablet, a navigation system, or the like. The communication module 140 may be provided as a wireless communication module for transmitting or receiving data with a radio communication protocol already known to the public.

The controller 150 may control general operation of the cleaning robot 10 and signal flows between the internal components of the cleaning robot 10, and perform a function to process data. When a command is input from the user or a preset condition is met, the controller 150 may run a program or application stored in a memory (not shown).

The controller 150 may include a processor (not shown), a read only memory (ROM) that stores a control program or application for controlling the cleaning robot 10, and a random-access memory (RAM) for storing signals or data input from the outside of the cleaning robot 10 or being used as a storage section corresponding to various tasks performed by the cleaning robot 10.

The controller 150 may determine a location of an object based on lidar data obtained by the lidar sensor 110. Specifically, the controller 150 may control the lidar sensor 110 to be driven according to a user setting or a user input to the user equipment 20 to obtain lidar data, and determine that there is an object in a rotation section having lidar data exceeding a reference value. In this case, when the location of the object is determined, the controller 150 may control the moving module 160 for the camera 120 arranged in the main body 11 to capture an area including the object. Specifically, when a position and direction of the cleaning robot 10 allows the camera 120 to capture the object, the controller 150 may capture the object by operating only the camera 120 without extra controlling of the moving module 160. When a position and direction of the cleaning robot 10 is inappropriate for the camera 120 to capture the object, the moving module 160 may be controlled to move the cleaning robot 10 straightly and/or rotationally.

Furthermore, the controller 150 may determine a location and a kind of the object based on sound data obtained by the sound detector 130.

Specifically, the controller 150 may process the sound data sent from the sound detector 130 to extract a feature point of the sound data, determine the feature point extracted based on the CNN as an input value, and identify the kind of the object based on an output value. For example, the controller 150 may process the sound data to figure out that the object outside the cleaning robot 10 is a companion animal.

As described above, the controller 150 may figure out the location of the object by analyzing a plurality of signal levels of the sound obtained from the plurality of microphones 131 to 134 in addition to identifying the object. The procedure for finding a location of the object based on the sound data will be described later with reference to FIGS. 9 and 10.

When detecting motion of an object based on the lidar data, the controller 150 may determine a direction in which the object is located, and specify an interested angle area in the direction toward the object. The interested angle area may correspond to an area for monitoring an object (a companion animal) through the camera 120 equipped in the cleaning robot 10, and an image obtained by capturing at least a portion of the interested angle area may be provided to the user equipment 20.

The controller 150 may determine a location of the object in a different method by processing lidar data obtained by the lidar sensor 110 and sound data obtained by the sound detector 130.

For example, when no motion of the object is detected and only a sound is detected from the object, the controller 150 may determine the location of the object based on the sound data.

Furthermore, when both the motion and the sound of the object are detected, the controller 150 may specify an interested angle area in an angle direction toward the object based on the detection of the motion of the object, and control the camera 120 and/or the moving module 160 to capture an area corresponding to the interested angle area when the location of the object determined based on the sound data belongs to the interested angle area specified based on the lidar data.

When the location of the object determined based on the sound data does not belong to the interested angle area specified based on the lidar data, the controller 150 may finally determine a location of the object according to an extra priority. This is a case that the object produces a sound as soon as the object is moved. In this case, the controller 150 may specify an interested angle area in a direction toward the object based on detection of the motion of the object, and in response to the location of the object determined based on the sound data not belonging to the interested angle area, control the camera 120 and/or the moving module 160 to capture a location detected with the sound of the object.

When a cleaning mode is started, the controller 150 may control the moving module 160 to move and control the cleaner 170 for performing cleaning by scattering dust on the floor and sucking up the scattered dust during the moving.

The cleaner 170 may include a brush module 171 for scattering debris including dust on the floor in an area to be cleaned, and a suction module 173 for sucking up the scattered debris. The brush module 171 includes a brush 171*b* that rotates to scatter the debris on the floor in the area to be cleaned, and a brush driver 171*a* that generates power provided to the brush 171*b*.

The brush 171*b* is arranged at a suction port formed on the bottom surface of the main body 11, and scatters the debris on the floor in the area to be cleaned to the inside of the suction port while rotating around the rotation axis perpendicular to the forward direction of the main body 11.

The brush driver 171*a* may include a brush motor and a driving circuit. A suction module 173 may suck the debris scattered by the brush 171*b* into a dust collector, and include a suction fan 173*b* that generates suction force to suck the debris into the dust collector and a suction driver 173*a* that generates power to rotate the suction fan 173*b*. The suction driver 173*a* may include a suction motor and a driving circuit.

Specifically, when the cleaning mode is started, the controller 150 may transmit a control signal to the wheel driver 161 for moving and transmit a control signal to the brush driver 171*a* and the suction driver 173*a* to perform cleaning.

The controller 150 may include at least one memory for storing a program for carrying out the aforementioned and following operations, and at least one processor for executing the program. In a case that the memory and the processor are each provided in the plural, they may be integrated in a single chip or physically distributed.

The storage 180 may store a control program and control data for controlling operation of the cleaning robot 10, and also store a cleaning map created based on the data obtained by the lidar sensor 110. For this, the storage 180 may be provided as a known-type of storage medium.

Components of the cleaning robot 10 and operations of the components have thus far been described. Based on the components, a controlling method of the cleaning robot 10 will now be described below.

Figure 6:
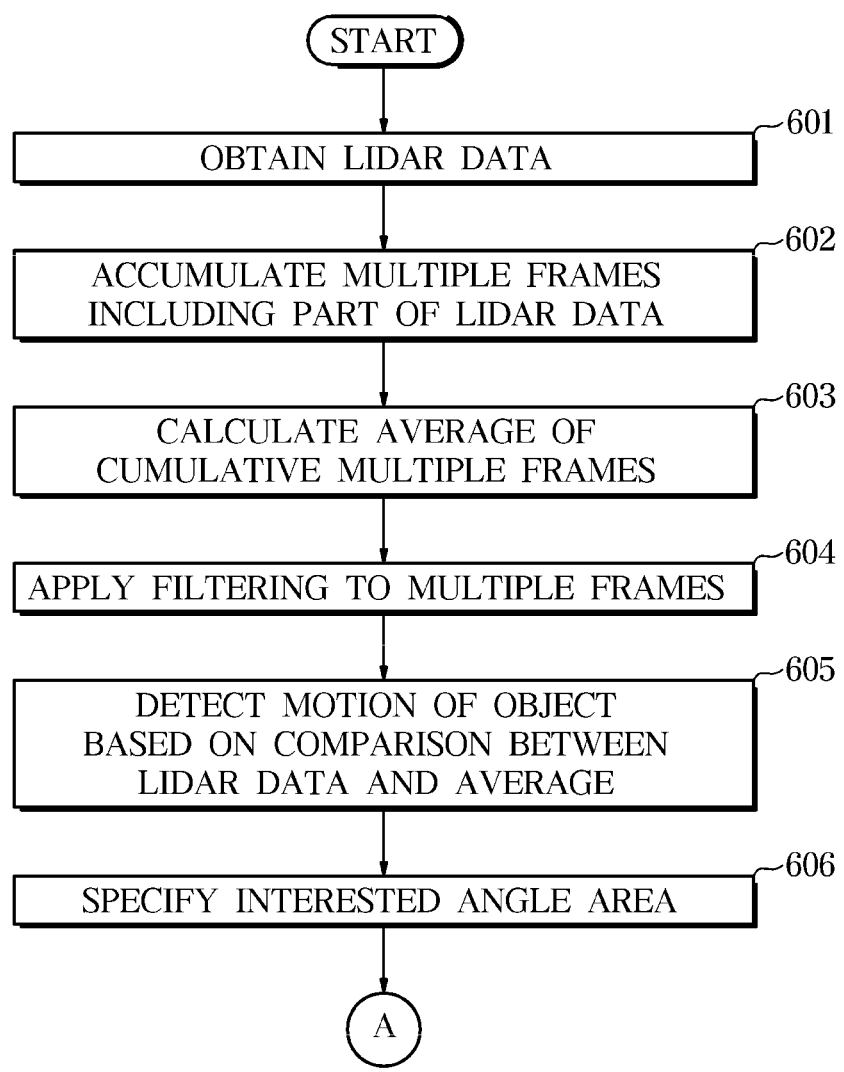
FIG. 6 is a flowchart for describing how a cleaning robot detects motion of an object, according to an embodiment of the disclosure.

FIG. 6 is a flowchart for describing how a cleaning robot detects motion of an object, according to an embodiment of the disclosure. The flowchart of FIG. 6 will be described in connection with FIG. 7.

Figure 7:
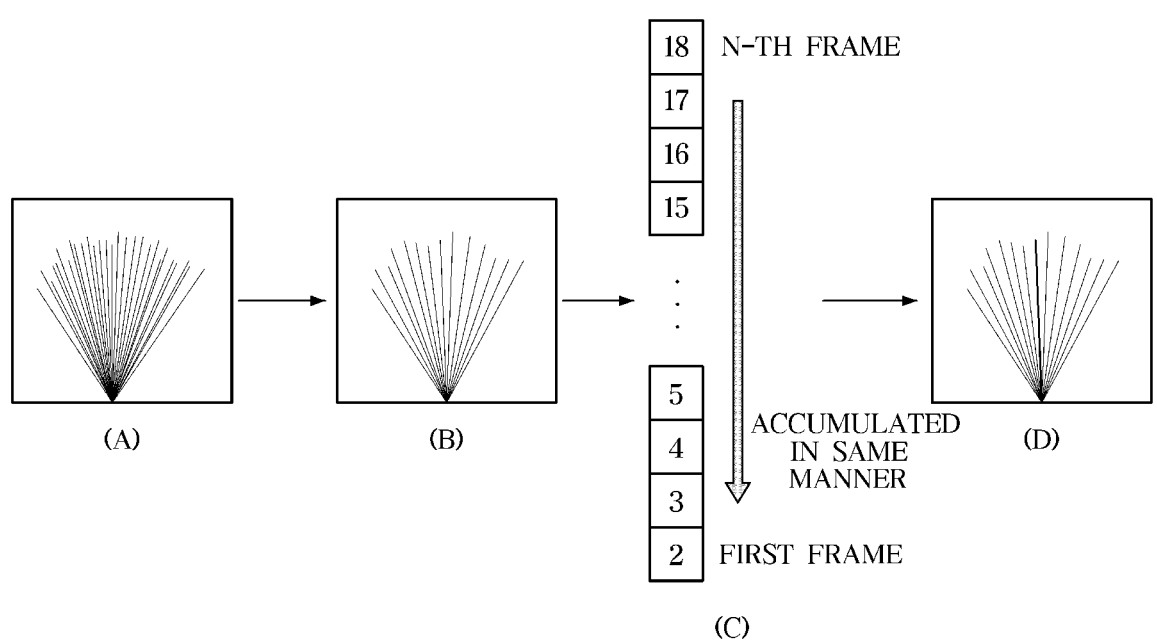
FIG. 7 is a diagram for describing a flowchart of FIG. 6 according to an embodiment of the disclosure.

FIG. 7 is a diagram for describing a flowchart of FIG. 6 according to an embodiment of the disclosure.

Referring to FIGS. 6 and 7, the controller 150 obtains lidar data through the lidar sensor 110, in operation 601. The lidar data is to detect an obstacle and/or an object in all directions by rotating the lidar sensor 110 at a constant speed to emit and receive light in 360 degrees. The lidar data includes e.g., information about a location and 3D depth of an object based on a time of flight (ToF), which is a time for light emitted from the lidar light emitter 111 to be received by the lidar light receiver 113 via the object. Accordingly, the controller 150 may obtain information about a distance to the object based on a particular point by rotating the lidar sensor 110 and identify whether the object is a stationary object or a moving object.

The controller 150 accumulates a plurality of frames including a portion of the lidar data, in operation 602. Referring to FIG. 7, the controlling method according to an embodiment includes calculating an average of the plurality of cumulative frames (C of FIG. 7) to set a reference value for a stationary obstacle to detect motion of the object in the rotation section of the lidar sensor 110. In this case, the lidar sensor 110 may obtain lidar data at a resolution of 0.5 degrees, and create a plurality of frames having a resolution of 1 degree through resolution filtering (A→B of FIG. 7).

The controller 150 calculates an average of the plurality of cumulative frames, in operation 603. In this case, the average corresponds to a value determined due to the stationary obstacle and corresponds to the reference value for detecting motion of the object. The average refers to a distance average between the cleaning robot 10 and the object obtained by the lidar sensor 110 with the lidar light emitter 111 and the lidar light receiver 113.

The controller 150 applies secondary filtering to the plurality of cumulative frames, in operation 604. The applied filtering is window filtering for compensating left and right swinging angles from the angle of question, thereby canceling the noise by comparing between an average of lidar data values in the left and right angles from the angle of question and a lidar data value in the angle of question (D of FIG. 7).

In 605, the controller 150 detects motion of the object based on a reference value obtained in operations 601 to 604. Specifically, the controller 150 detects motion of the object based on a difference between the lidar data obtained after accumulating all of the plurality of frames and the average value, in operation 605. Specifically, the controller 150 may calculate the reference value which is an average of distances to the object in respective angles based on the lidar data obtained by rotating the lidar sensor 110, compare lidar data obtained subsequently with the reference value, and detect a moving object when there is a certain amount of change from the reference value. In an embodiment of the disclosure, the controller 150 may determine that there is an object located in a rotation section with lidar data exceeding the reference value. In this case, the rotation section may correspond to the whole or part of section in which the lidar sensor 110 is rotated, and corresponds to an angle range of lidar data belonging to the frame.

When motion of an object is detected in a certain rotation section, the controller 150 specifies an interested angle area toward a location where the motion of the object is detected. In the meantime, the controller 150 may expand the interested angle area by taking plenty of motion of the object into account. Specifically, the controller 150 may detect motion of an object in a wider rotation section by expanding the angle range of lidar data belonging to the frame. In an embodiment of the disclosure, the controller 150 may detect an increase in moving range of the object based on detection of motion of the object, and expand the existing interested angle area when the increase in moving range of the object is detected.

In the disclosure, in addition to the method of FIG. 6, simultaneous localization and mapping (SLAM), which is one of the functions of the lidar sensor 110, may be used to detect motion of an object and determine a location of the object.

Figure 8:
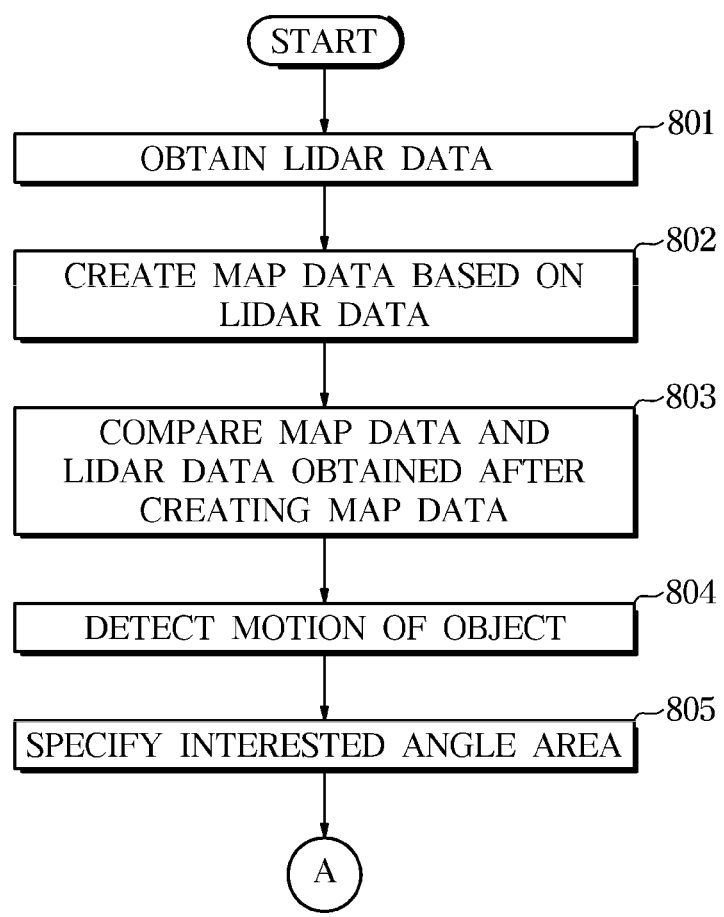
FIG. 8 is a flowchart for describing how a cleaning robot detects motion of an object, according to an embodiment of the disclosure.

FIG. 8 is a flowchart for describing how a cleaning robot detects motion of an object, according to an embodiment of the disclosure.

Referring to FIG. 8, the controller 150 obtains lidar data through the lidar sensor 110, in operation 801. The lidar data is to detect an obstacle and/or an object in all directions by rotating the lidar sensor 110 at a constant speed to emit and receive light in 360 degrees.

The controller 150 creates map data based on the lidar data, in operation 802. Specifically, the controller 150 may create a cleaning map by accumulating lidar data from all directions in real time.

The controller 150 compares lidar data obtained after creating the map data with the map data, in operation 803. In this case, the controller 150 may detect motion of the object by detecting a lidar data value in addition to a fixed value, i.e., the map data, in operation 804. Furthermore, when motion of the object is detected, the controller 150 may find a location of the object on the cleaning map and calculate a coordinate value on the cleaning map. In this case, the controller 150 may calculate a distance and angle of the object to a current location of the cleaning robot 10.

When motion of the object is detected, the controller 150 specifies an interested angle area toward the location where the motion of the object is detected, in operation 805. In this case, the interested angle area may be an area having a certain angle range based on an angle toward the location of the object.

In the disclosure, the location of the object may be figured out by detecting a sound of the object in addition to detecting motion of the object. As described above, the cleaning robot 10 is equipped with the sound detector 130 including the plurality of microphones 131 to 134 to determine whether the object is a companion animal by identifying the sound produced from the object, and further determine a location of the object based on signal levels of the sound obtained from the respective microphones 131 to 134.

Figure 9:
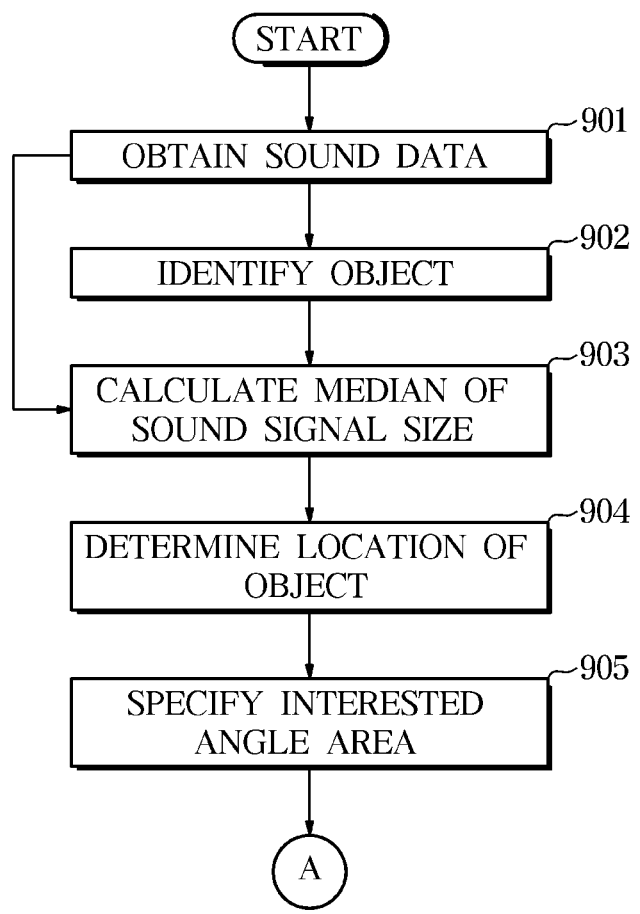
FIG. 9 is a flowchart for describing how a cleaning robot detects an object on a sound basis, according to an embodiment of the disclosure.

FIG. 9 is a flowchart for describing how a cleaning robot detects an object on a sound basis, according to an embodiment of the disclosure. The flowchart of FIG. 9 will be described in connection with FIG. 10.

Figure 10:
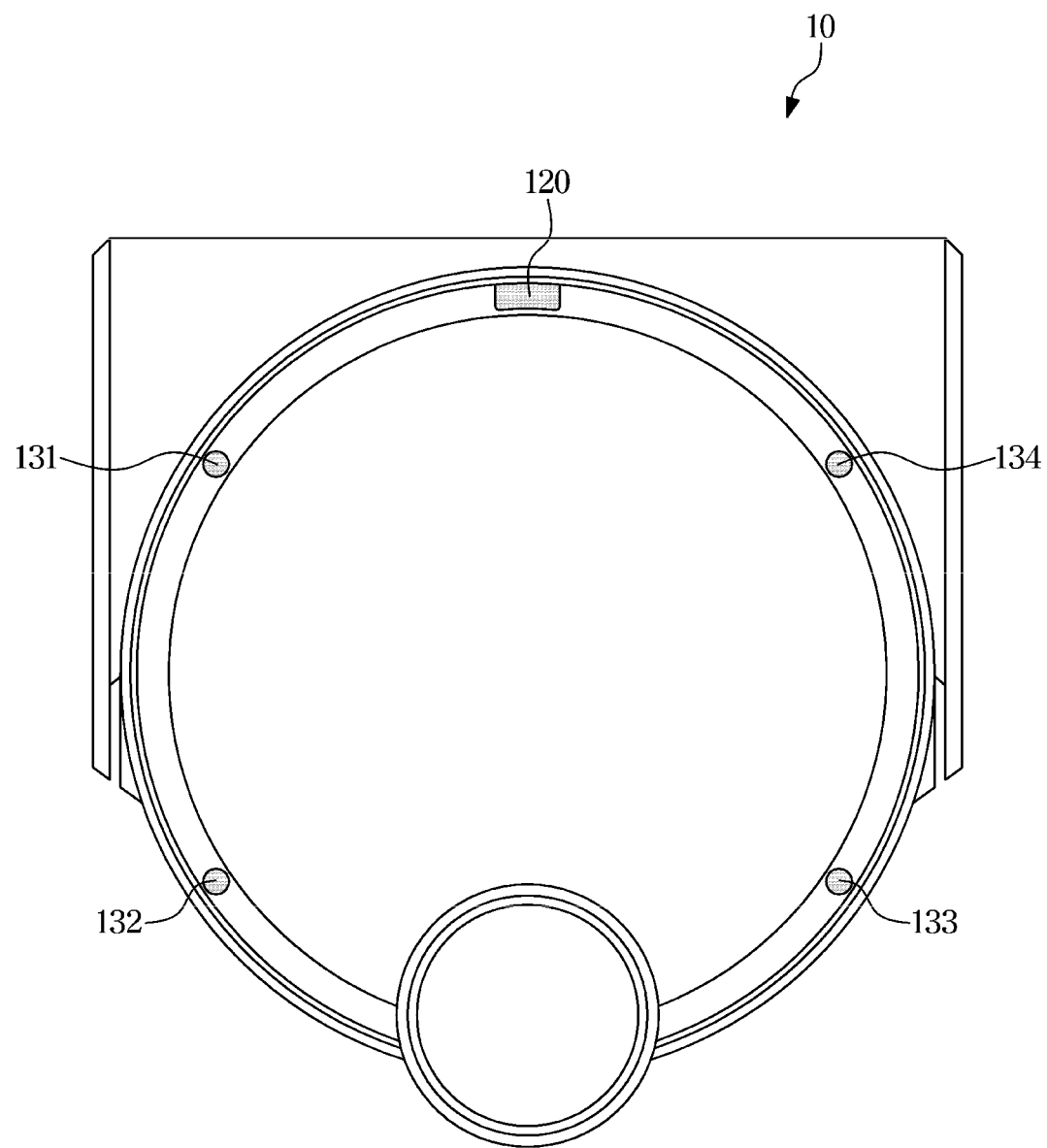
FIG. 10 is a diagram for describing a flowchart of FIG. 9 according to an embodiment of the disclosure.

FIG. 10 is a diagram for describing a flowchart of FIG. 9 according to an embodiment of the disclosure.

Referring to FIGS. 9 and 10, the controller 150 obtains sound data through the sound detector 130, in operation 901.

The controller 150 identifies the object based on the obtained sound data, in operation 902. Specifically, the controller 150 selects a partial section related to the obtained sound data to extract a feature point in the partial section. In this case, the controller 150 may determine the feature point extracted based on the CNN to identify a kind of the object. For example, the controller 150 may process the sound data obtained by the sound detector 130 to determine the object that has produced the sound as a companion animal.

The controller 150 may calculate a median of the sound signal levels in operation 903 and determine a location of the object in operation 904. For example, when the sound signal level obtained from the first microphone 131 and the fourth microphone 134 is 10 (a relative value) and the sound signal level obtained from the second microphone 132 and the third microphone 133 is 8, the median of the signal levels belongs to the above of the 12 o'clock direction. In this case, the location of the object belongs to a line extending from a zero point to the median. Furthermore, the controller 150 may calculate an average of signal levels of sound obtained from the plurality of microphones 131 to 134, and figure out a distance between the cleaning robot 10 and the object based on the signal level of the sound.

In operation 905, the controller 150 specifies an interested angle area toward the location of the object, in 805. In this case, the interested angle area may be an area having a certain angle range based on an angle toward the location of the object.

In the meantime, the cleaning robot 10 according to an embodiment may determine a location of the object through sensor fusion between the lidar sensor 110 and the sound detector 130. As described above, the object may correspond to a moving companion animal, and the companion animal may make a sound while moving. In this case, the cleaning robot 10 may determine a final location of the object by setting priorities between the lidar sensor 110 and the sound detector 130. This will be described with reference to FIG. 11.

Figure 11:
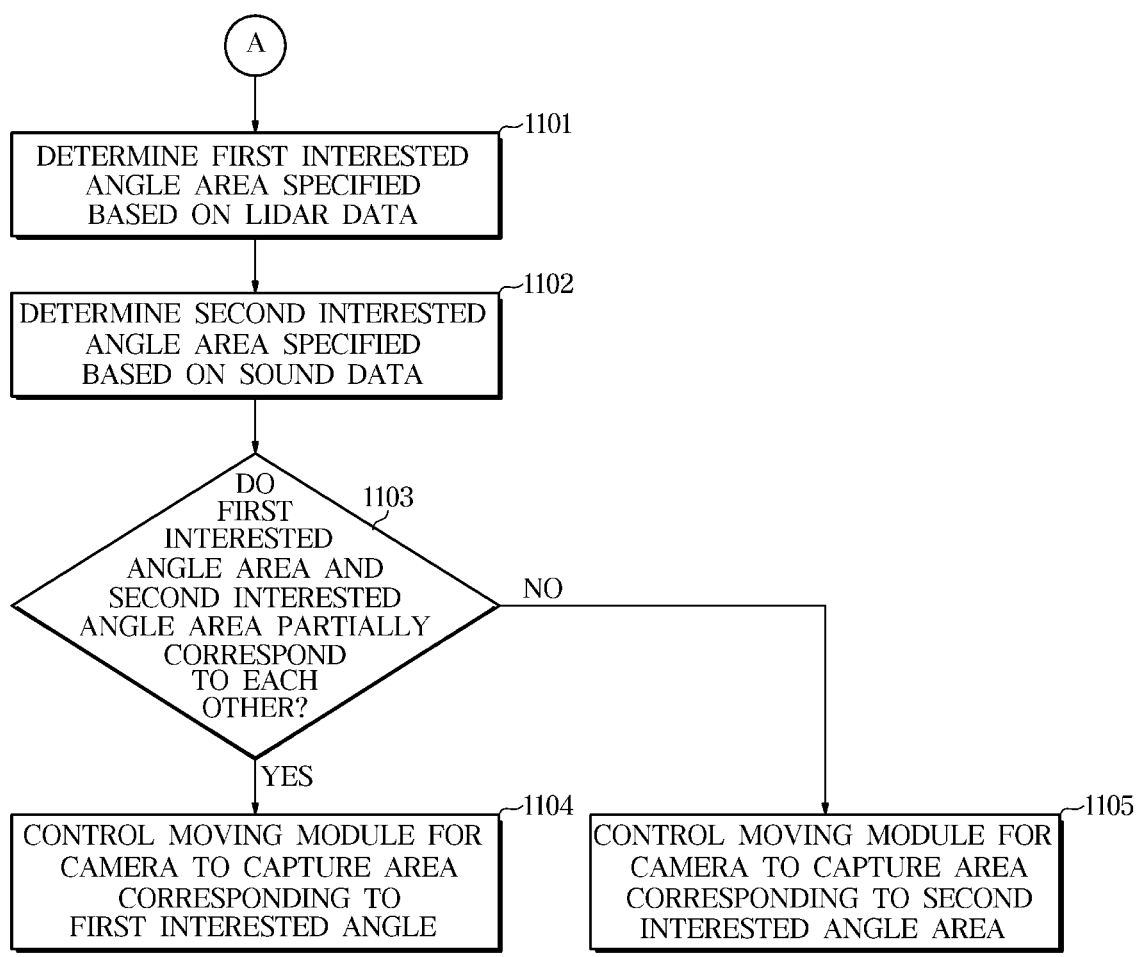
FIG. 11 is a flowchart of a controlling method of a cleaning robot, according to an embodiment of the disclosure.

FIG. 11 is a flowchart of a controlling method of a cleaning robot, according to an embodiment of the disclosure.

Referring to FIG. 11, the controller 150 determines a first interested angle area specified based on lidar data in operation 1101, and determines a second interested angle area specified based on sound data in operation 1102. The first interested angle area refers to an angle range to which an object is expected to belong by detecting motion of the object through the lidar sensor 110, and the second interested angle area refers to an angle range to which the object is expected to belong by detecting sound of the object through the sound detector 130. The first interested angle area and the second interested angle area may each have a certain angle section, and may be a single angle value indicating a direction to a particular location.

The controller 150 determines whether the first interested angle area and the second interested angle area partially correspond to each other, in operation 1103.

When the first interested angle area and the second interested angle area partially correspond to each other, the controller 150 controls the moving module 160 for the camera 120 to capture an area corresponding to the first interested angle area, in operation 1104. This is the case that movement and sound of the companion animal are detected from the same location, in which case the movement of the companion animal is not big.

In an embodiment of the disclosure, the controller 150 may specify the first interested angle area in an angle direction toward the object based on the detection of motion of the object, and in response to the location of the object determined based on the sound data belonging to the first interested angle area, control the moving module 160 to capture an area corresponding to the first interested angle area. In this case, the location determined based on the sound data may be replaced by the second interested angle area based on the location.

Unlike what is described above, when the first interested angle area and the second interested angle area do not partially correspond to each other, the moving module 160 is controlled for the camera 120 to capture an area corresponding to the second interested angle area, in operation 1105. This is the case that the companion animal moves relatively a lot, in which case a capturing area of the camera 120 is determined based on the sound that makes it easy to determine the real-time location of the companion animal.

In an embodiment of the disclosure, the controller 150 may specify the first interested angle area in a direction toward the object based on the detection of motion of the object, and in response to the location of the object determined based on the sound data not belonging to the first interested angle area, control the moving module 160 to capture a location from which the sound of the object is detected. In this case, the location determined based on the sound data may be replaced by the second interested angle area based on the location.

Furthermore, in an embodiment of the disclosure, when no motion of the object is detected, the controller 150 may control the moving module 160 to capture a location from which the sound of the object is detected based on the sound data. This is the case that the location of the companion animal may not be found with the lidar sensor 110 because no motion of the companion animal is detected, in which case a capturing area of the camera 120 may be determined only with the sound produced from the companion animal.

In an embodiment of the disclosure, the cleaning robot 10 may further include the communication module 140 for communicating with the user equipment 20. Accordingly, the user may remotely control the cleaning robot 10 with the user equipment 20 and receive an image of the interior of the house obtained from the cleaning robot 10. This will be described with reference to FIG. 12.

Figure 12:
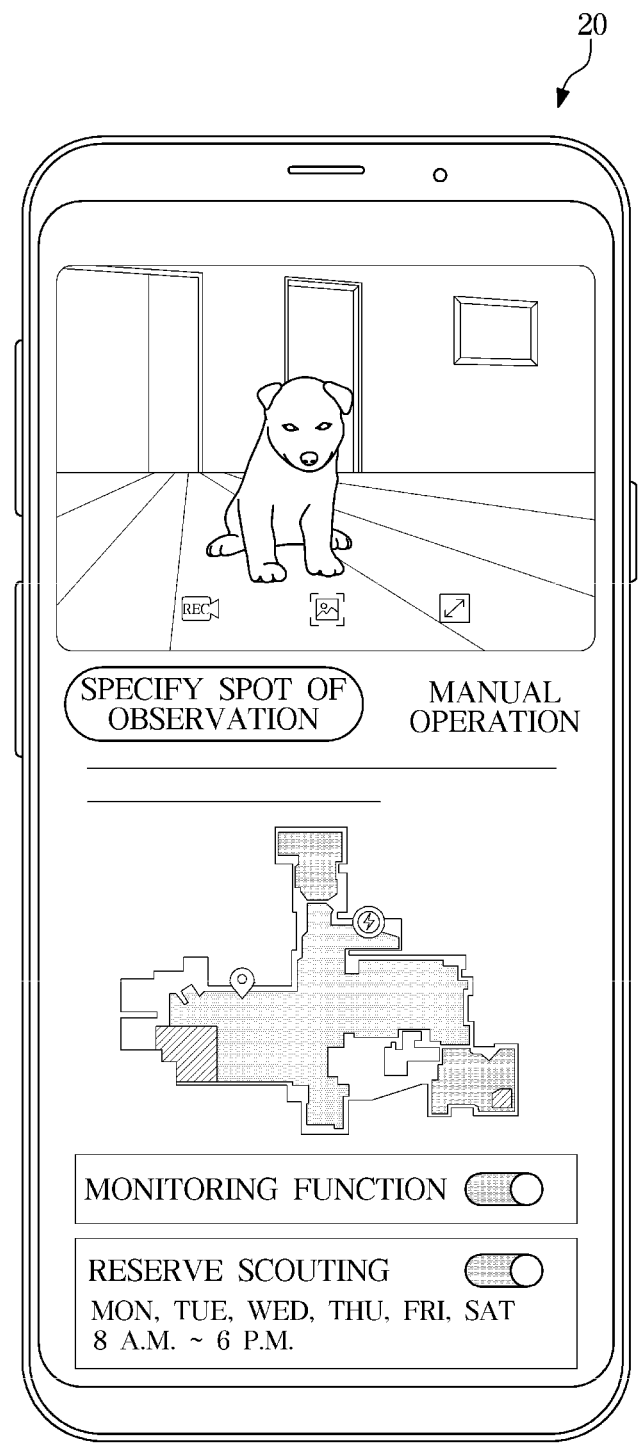
FIG. 12 illustrates a function provided by a cleaning robot to a user equipment, according to an embodiment of the disclosure.

FIG. 12 illustrates a function provided by a cleaning robot to a user equipment, according to an embodiment of the disclosure.

Referring to FIG. 12, the user equipment 20 may provide a cleaning map obtained from the cleaning robot 10 through an application. Furthermore, as described above, the user equipment 20 may found a location of the object (a companion animal) through the lidar sensor 110 and the sound detector 130, and control the moving module 160 to move the cleaning robot 10 to a location suitable for the camera 120 to capture the object.

When the user activates a monitoring function through an application, the cleaning robot 10 may figure out the location of the object based on the motion and/or sound of the object so that the camera 120 equipped in the cleaning robot 10 may capture the object.

In an embodiment of the disclosure, the cleaning robot 10 may further include the communication module 140 for communicating with the user equipment 20, and the controller 150 may control the communication module 140 to provide an event about the object to the user equipment 20 when a sound is determined to be produced from the object as a result of processing the sound data obtained through the sound detector 130. In this case, the user may receive the event through the application, and control the cleaning robot 10 for the camera 120 to capture the object by activating the monitoring function.

Furthermore, in an embodiment of the disclosure, the cleaning robot 10 may further include the communication module 140 for communicating with the user equipment 20, and the controller 150 may control the communication module 140 to provide an event about the object to the user equipment 20 when motion is determined to be detected from the object as a result of processing the lidar data obtained through the lidar sensor 110. In this case, the controller 150 may control the camera 120 of the cleaning robot 10 to capture an area corresponding to an interested angle area, and control the communication module 140 to provide the captured image of the object to the user equipment 20.

In the disclosure, the cleaning robot 10 may interact with the object in addition to detecting and capturing the object as described above. For example, the cleaning robot 10 may detect a touch from a companion animal, and in response to the touch from the companion animal, output a sound that intrigues the companion animal.

Figure 13:
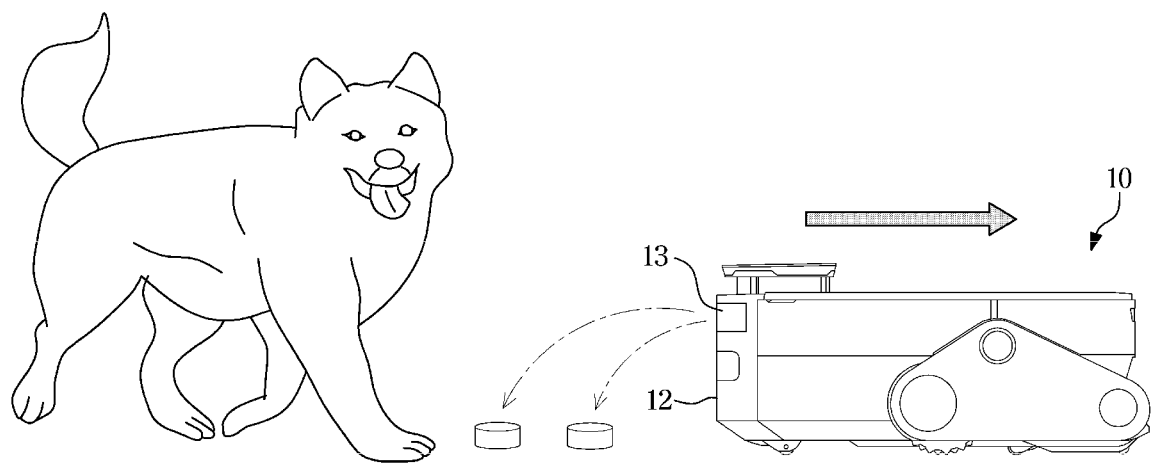
FIG. 13 illustrates a cleaning robot providing snacks, according to an embodiment of the disclosure.

FIG. 13 illustrates a cleaning robot providing snacks, according to an embodiment of the disclosure.

Referring to FIG. 13, the cleaning robot 10 may provide snacks to an object. For this, the cleaning robot 10 may include a dispenser 13 for storing and discharging contents. The contents may be snacks for the companion animal. The dispenser 13 may be arranged on the side of the rear cover 12 of the cleaning robot 10 so that the cleaning robot 10 may throw the contents while moving forward. In an embodiment of the disclosure, the cleaning robot 10 may found a location of the object, and control the dispenser 13 to throw the contents while moving in a direction opposite of the object from the perspective of the cleaning robot 10. In this case, the cleaning robot 10 may throw the contents at preset time intervals. The user may control the cleaning robot 10 to control a time and interval to throw the contents through a setting for the user equipment 20.

Figure 14:
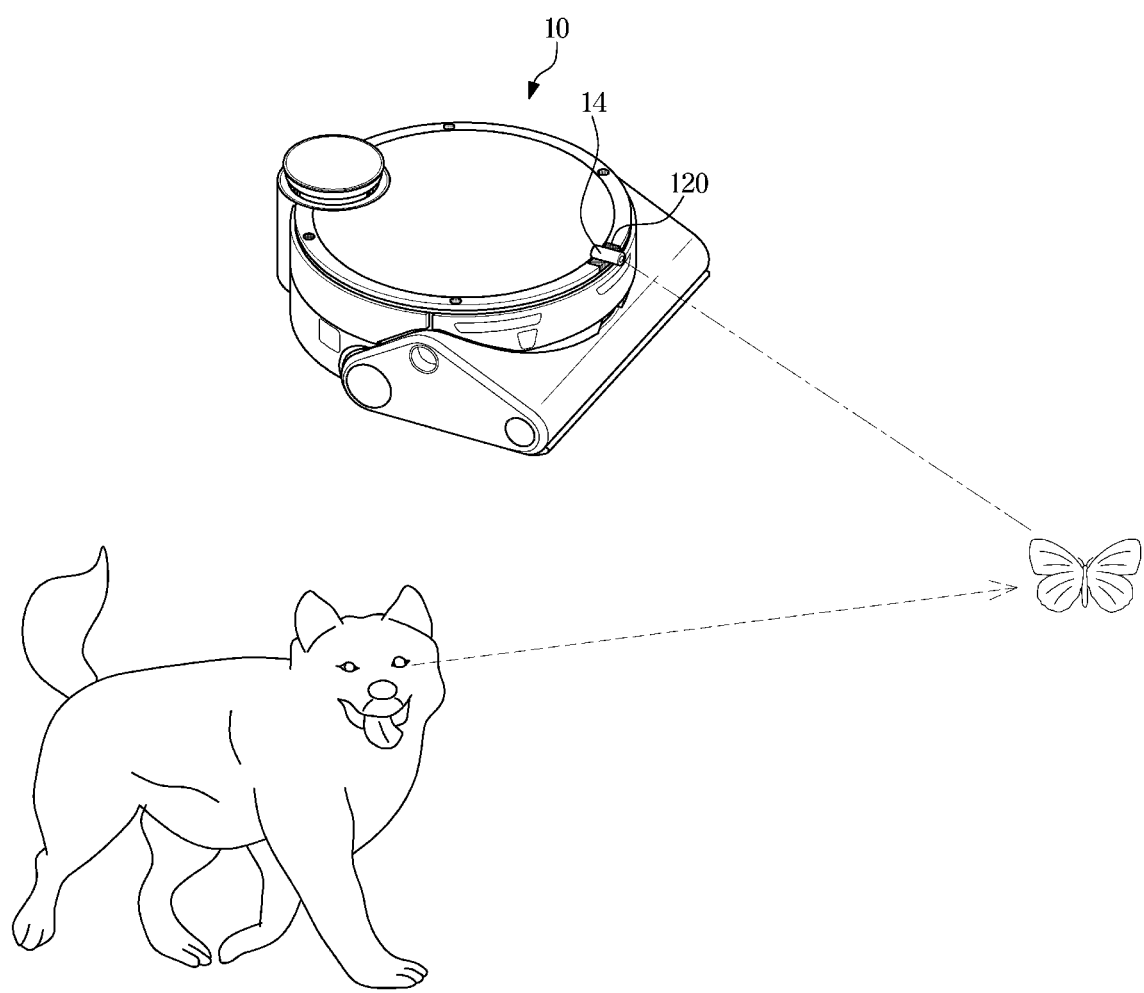
FIG. 14 illustrates a cleaning robot providing a playtime with laser, according to an embodiment of the disclosure.

FIG. 14 illustrates a cleaning robot providing a playtime with laser, according to an embodiment of the disclosure.

Referring to FIG. 14, the cleaning robot 10 may include a laser 14 to project a laser beam to reflect off the floor. The laser 14 may be arranged in the main body 11 of the cleaning robot 10. The laser 14 may output a laser beam to reflect off the floor in the shape of a dot, but the laser beam may have other various shapes according to settings. For example, the shape of a butterfly is shown in FIG. 14, but various shapes of laser beams may be output based on the kind of the companion animal. The cleaning robot 10 may induce the object to follow the reflected beam output on the floor by outputting the laser beam while moving. In this case, the cleaning robot 10 may figure out through the camera 120 equipped in the main body 11 how close the object comes to the reflected beam. When the object comes to the reflected beam at a certain distance or less, the cleaning robot 10 may move to an arbitrary direction to induce a movement of the object.

Figure 15:
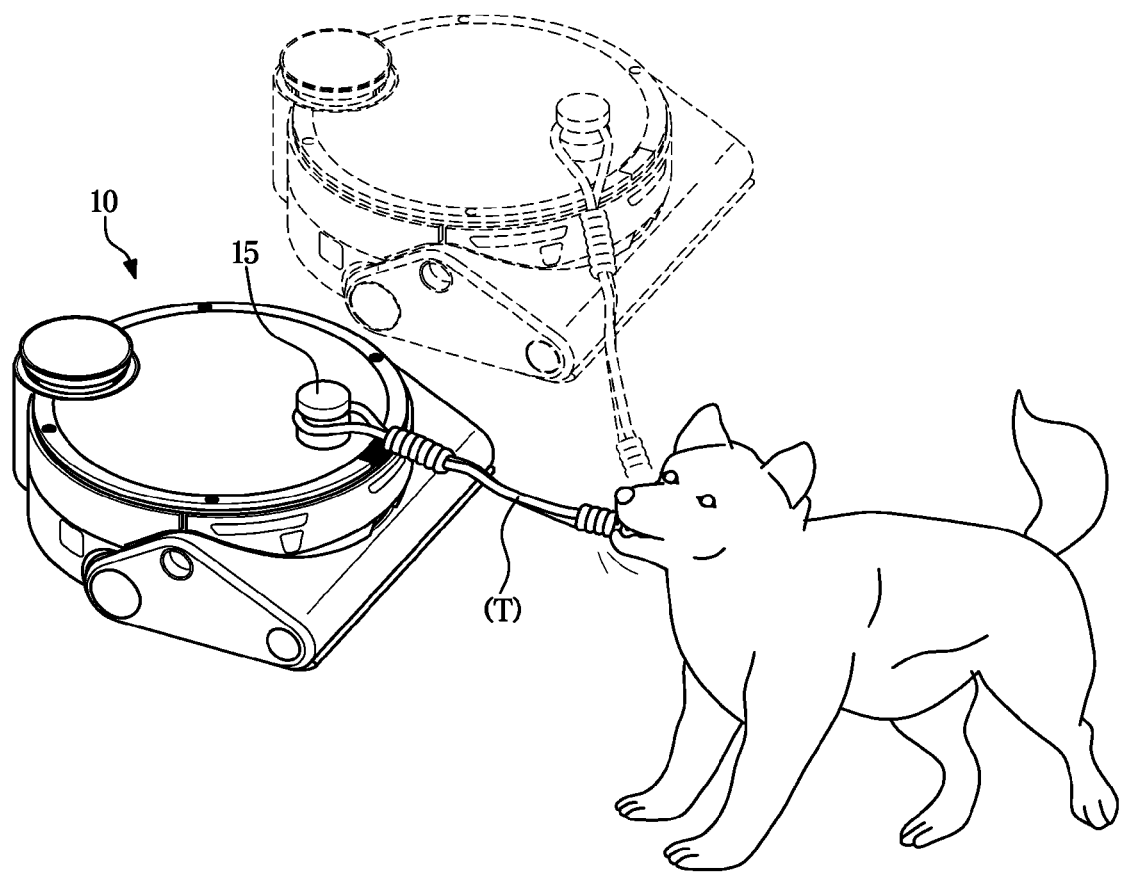
FIG. 15 illustrates a cleaning robot providing a tug play, according to an embodiment of the disclosure.

FIG. 15 illustrates a cleaning robot providing a tug play, according to an embodiment of the disclosure.

Referring to FIG. 15, the cleaning robot 10 may include a holder 15 for a tug toy T to be attached to the main body 11. When the companion animal has the tug toy T in its mouth, the cleaning robot 10 may detect external force from the companion animal and control the moving module 160 to move the cleaning robot 10 straightly and/or rotationally in a direction opposite of the external force.

Meanwhile, the embodiments of the disclosure may be implemented in the form of a recording medium for storing instructions to be carried out by a computer. The instructions may be stored in the form of program codes, and when executed by a processor, may generate program modules to perform operations in the embodiments of the disclosure. The recording media may correspond to computer-readable recording media.

The computer-readable recording medium includes any type of recording medium having data stored thereon that may be thereafter read by a computer. For example, it may be a read only memory (ROM), a random access memory (RAM), a magnetic tape, a magnetic disk, a flash memory, an optical data storage device, or the like.

The machine-readable storage medium may be provided in the form of a non-transitory recording medium. The term 'non-transitory recording medium' may mean a tangible device without including a signal, e.g., electromagnetic waves, and may not distinguish between storing data in the recording medium semi-permanently and temporarily. For example, the non-transitory recording medium may include a buffer that temporarily stores data.

In an embodiment of the disclosure, the aforementioned method according to the various embodiments of the disclosure may be provided in a computer program product. The computer program product may be a commercial product that may be traded between a seller and a buyer. The computer program product may be distributed in the form of a storage medium (e.g., a compact disc read only memory (CD-ROM)), through an application store (e.g., Play Store™), directly between two user devices (e.g., smart phones), or online (e.g., downloaded or uploaded). In the case of online distribution, at least part of the computer program product (e.g., a downloadable app) may be at least temporarily stored or arbitrarily created in a storage medium that may be readable to a device, such as a server of the manufacturer, a server of the application store, or a relay server.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A controlling method performed by a cleaning robot comprising a lidar sensor and a camera, the controlling method comprising:
obtaining lidar data of a rotation section with the lidar sensor rotating multiple times;

calculating a reference value, which is an average of distances to an object for respective angles, based on the obtained lidar data;

comparing the lidar data obtained after the reference value is calculated with the reference value;

detecting a motion of the object based on a result of the comparing and determining that the object is located in a part of the rotation section in which the motion is detected;

specifying an interested angle area which is part of the rotation section and determining a size of the interested angle area according to a size of a movement range of the object; and controlling a moving module of the cleaning robot so that the camera can capture the interested angle area.

2. The controlling method of claim 1, wherein the cleaning robot includes a sound detector arranged in a main body of the cleaning robot and configured to obtain a sound data about a sound produced from outside the cleaning robot, and wherein the method further comprises:
identifying the object by processing the sound data.

3. The controlling method of claim 2, wherein the sound detector comprises a plurality of microphones symmetrically arranged in the main body, and wherein the identifying of the object comprises determining a location of the object based on a median of signal levels of sound obtained from the plurality of microphones.

4. The controlling method of claim 3, wherein the controlling the moving module comprises:

in response to the location of the object determined based on the sound data belonging to the interested angle area, controlling the moving module to capture the area corresponding to the interested angle area.

5. The controlling method of claim 3, further comprising:

in response to the location of the object determined based on the sound data not belonging to the interested angle area, controlling the moving module to capture the location from which sound of the object is detected.

6. The controlling method of claim 3, further comprising controlling the moving module to capture the location from which sound of the object is detected based on the sound data in response to no motion of the object being detected.

7. The controlling method of claim 3, wherein the cleaning robot includes a communication module configured to perform communication with a user equipment, and wherein the method further comprises:
controlling the communication module to provide an event about the object to the user equipment in response to determining that the sound is produced from the object as a processing result of the sound data.

8. The controlling method of claim 1, wherein the cleaning robot includes a communication module configured to perform communication with a user equipment, and wherein the method further comprises:
controlling the camera to capture an area corresponding to the interested angle area and controlling the communication module to provide an image of a captured object to the user equipment.

9. The controlling method of claim 1, wherein the cleaning robot includes a dispenser configured to store contents and discharge the contents, and wherein the method further comprises:
controlling the dispenser to discharge the contents at preset intervals in response to detection of motion of the object.

10. The controlling method of claim 1, wherein the cleaning robot includes a laser arranged in a main body of the cleaning robot and configured to output a laser beam, and wherein the method further comprises:
controlling the laser to output the laser beam downward in response to detection of motion of the object.

11. A cleaning robot comprising:

a main body;

a moving module configured to move the main body;

a lidar sensor configured to include a lidar light emitter and a lidar light receiver and obtain lidar data of a rotation section as the lidar sensor rotates multiple times;

a camera configured to obtain an image external to the cleaning robot;

memory storing one or more computer programs; and one or more processors communicatively coupled to the lidar sensor and the memory, wherein the one or more computer programs stored in the memory include computer-executable instructions that, when executed by the one or more processors individually or collectively, cause the cleaning robot to:

calculate a reference value, which is an average of distances to an object for respective angles, based on the obtained lidar data, compare lidar data obtained after the reference value is calculated with the reference value, detect motion of the object based on a result of the comparing, determine that the object is located in a part of the rotation section in which the motion is detected, specify an interested angle area which is part of the rotation section and determining a size of the interested angle area according to a size of a movement range of the object; and control the moving module of the cleaning robot so that the camera can capture the interested angle area.

12. The cleaning robot of claim 11, further comprising:

a sound detector arranged in the main body of the cleaning robot and configured to obtain a sound data about a sound produced from outside the cleaning robot, wherein the one or more computer programs further include computer-executable instructions that, when executed by the one or more processors individually or collectively, cause the cleaning robot to identify the object by processing the sound data.

13. The controlling method of claim 1, wherein the size of the interested angle area is expanded based on the motion of the object being increased.

14. The cleaning robot of claim 12, wherein the sound detector comprises a plurality of microphones symmetrically arranged in the main body, and wherein the one or more computer programs further include computer-executable instructions that, when executed by the one or more processors individually or collectively, cause the cleaning robot to:

determine a location of the object based on a median of signal levels of sound obtained from the plurality of microphones, and in response to the location of the object determined based on the sound data belonging to the interested angle area, control the moving module to capture an area corresponding to the interested angle area.

15. The cleaning robot of claim 12, wherein the controlling of the moving module comprises:
in response to the location of the object determined based on the sound data belonging to the interested angle area, control the moving module to capture the area corresponding to the interested angle area.

16. The cleaning robot of claim 12, wherein the one or more computer programs further include computer-executable instructions that, when executed by the one or more processors individually or collectively, cause the cleaning robot to, in response to the location of the object determined based on the sound data not belonging to the interested angle area, control the moving module to capture the location from which sound of the object is detected.

17. The cleaning robot of claim 12, wherein the one or more computer programs further include computer-executable instructions that, when executed by the one or more processors individually or collectively, cause the cleaning robot to control the moving module to capture the location from which sound of the object is detected based on the sound data in response to no motion of the object being detected.

* * * * *